July 16, 1935.  C. H. BOCK  2,008,574

LUBRICATING DEVICE

Filed July 29, 1932

INVENTOR.
CLARENCE H. BOCK
BY
ATTORNEY.

Patented July 16, 1935

2,008,574

UNITED STATES PATENT OFFICE 2,008,574

LUBRICATING DEVICE

Clarence H. Bock, South Bend, Ind., assignor to The Lubrication Corporation, South Bend, Ind., a corporation of Delaware Application July 29, 1932, Serial No. 625,581

6 Claims. (Cl. 284—17)

This invention relates to improvements in lubrication devices and more particularly to lubricant discharge nozzles of the lubricant pressure operated clamp type.

Heretofore pressure operated clamp type discharge nozzles have been provided for clamping engagement with lubricant receiving nipples or fittings wherein the pressure operated clamping mechanism operated simultaneously with the admission of lubricant under pressure to the discharge orifice of the nozzle or in which the clamping mechanism became partially effective prior to delivery of lubricant under pressure through the discharge orifice. Such nozzles however, are apt to leak between the discharge orifice and the nipple or fitting prior to building up adequate clamping forces when the nozzle is initially engaged and operated upon a nipple or fitting.

An object of the invention is to provide a pressure operated clamp nozzle wherein a predetermined clamping force must be built up to clamp the nozzle upon the lubricant receiving fitting prior to the discharge of lubricant from the nozzle into the fitting.

Another object is to provide a lubricant nozzle of the character described wherein the clamping force applied to clamp the nozzle upon the fitting at the time of initial discharge of lubricant from the nozzle is constant regardless of the lubricant pressure to which the nozzle is subjected and wherein the clamping force may be increased thereafter in proportion to the lubricant pressure applied.

A further object is to provide a lubricant discharge nozzle which is of simple structure and capable of withstanding high lubricant pressures.

Figure 1:
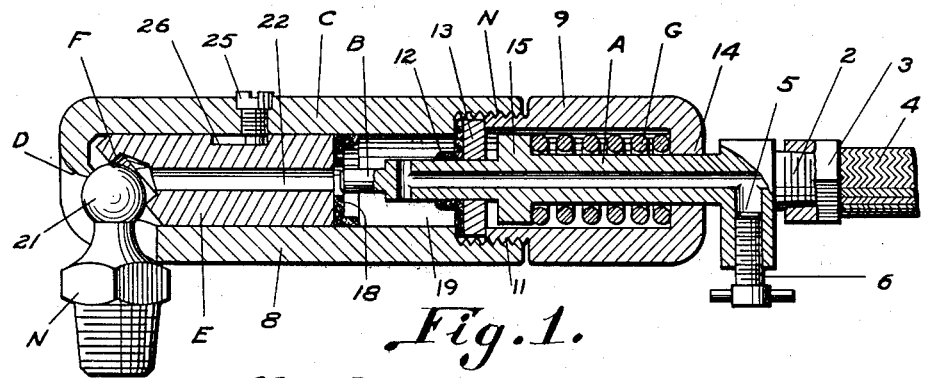
Figure 2:
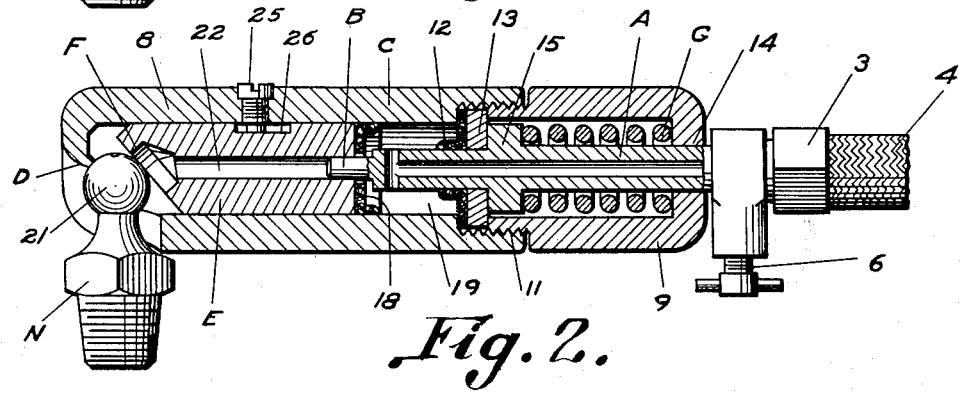
Figure 3:
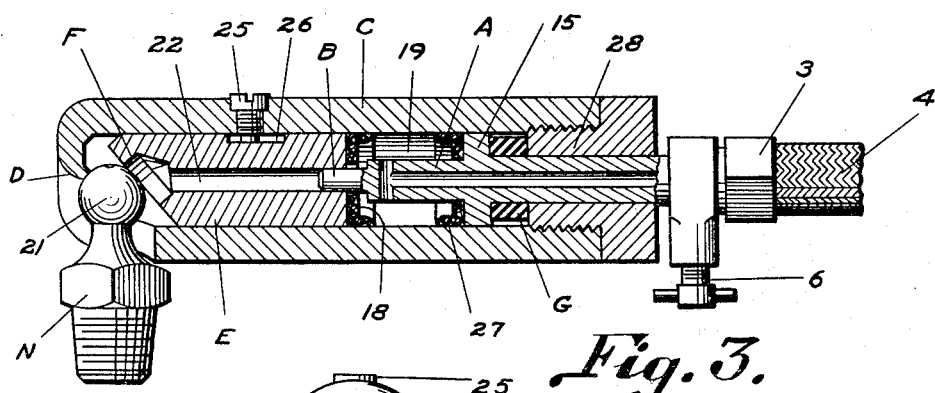
Figure 4:
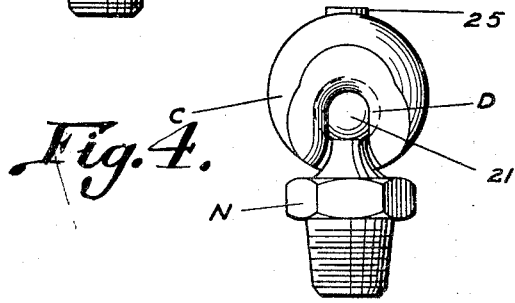

Other objects, the advantages, and uses of the invention, will be, or should become apparent after reading the following description and claims and after consideration of the accompanying drawing forming a part of this specification in which:

Fig. 1 is a sectional elevation of a lubricant discharge nozzle constructed in accordance with my invention clamped upon a lubricant receiving fitting, Fig. 2 is a view similar to Fig. 1 of the nozzle in its unclamped position, Fig. 3 is a sectional elevation of another form of the discharge nozzle, and Fig. 4 is a part elevation of the nozzle of Fig. 1.

In general the lubricant discharge nozzles selected for illustration herein comprise, a conduit A having its rearward end arranged for connection to a source of lubricant supply and its forward end formed to provide a valve plunger B, the bore of the conduit having its terminus in a transverse portion rearward of the valve plunger B, a substantially tubular clamping member C slidably mounted about and relative to the conduit A formed at its forward end to provide a clamping jaw D, a conduit member E slidable within the clamping member C provided with a discharge orifice F at its forward end and having its bore arranged to receive and to be closed by introduction of the valve plunger B therein, sealing means between the inner walls of the clamping member C and the conduit members E and A respectively, and resilient means G urging the conduit member A forwardly relative to the clamping member C.

Referring particularly to Figs. 1, 2 and 4, the rearward end of the conduit A is provided with external screw threads 2 for engagement with the internally threaded end fitting 3 of a lubricant conducting hose 4 through which lubricant under pressure may be conducted to the nozzle from a suitable pressure feed lubricant supply. A pressure relief chamber 5 is provided in the conduit A having a screw threaded plunger 6 forming one wall thereof which may be turned to increase the chamber capacity and thus relieve pressure within the nozzle subsequent to shutting off the supply of lubricant thereto and prior to detaching the nozzle from the fitting whenever such relief of pressure becomes necessary to remove the nozzle. In most servicing applications the functioning of the relief chamber may not be necessary as will be hereinafter explained.

The clamping member C consists of forward and rearward sections 8 and 9 respectively secured to one another by cooperating screw threads 11. A packing gland 12 of rawhide and an annular rigid metal block 13 are secured between the adjacent ends of the sections 8 and 9 of the clamping member C to provide a lubricant tight seal between the conduit A and that space within the clamping member C immediately adjacent the inner end of the conduit member E. The remote end of the section 9 is turned inwardly at 14 to slidably engage with the conduit A and further to provide an end wall for the clamping member against which one end of the compression spring G may bear. The opposite end of the spring G bears upon a flange 15 formed on the outer wall of the conduit A thus urging the conduit yieldingly to assume the position shown in Fig. 2 with the flange 15 of the conduit abutting the adjacent wall of the block 13.

A sealing member 18 which may be in the form of a rawhide cup leather as shown is provided for the inner end of the conduit member E and arranged with its skirt in engagement with the inner wall of the clamping member C. A lubricant tight expandable chamber 19 is thus formed between the conduit A and the member E which is in communication with the source of lubricant supply through the conduit A, and with the discharge orifice F through the conduit member E when the parts are in the position shown in Fig. 1. Lubricant under pressure within the chamber 19 may therefore result in expansion of the chamber through movement of the conduit A and conduit member E away from one another, the former against the force of the spring G and the latter toward and into engagement with the head 21 of a lubricant receiving fitting N with which the discharge orifice F of the nozzle has been brought into registration prior to admitting lubricant under pressure to the nozzle. During this function of the nozzle the clamping jaw D will be urged into engagement with the opposed side of the fitting head 21 by relative movement between the conduit member E and the clamping member C, and the valve plunger B will lie partially within the bore 22 of the conduit member E thus precluding the admission of lubricant under pressure to the discharge orifice F. Lubricant pressure within the chamber 19 may thus operate to securely clamp the nozzle upon the fitting head under relatively high clamping forces and as the pressure increases urge the conduit A rearwardly against the force of the spring G until the valve plunger B is withdrawn from the bore 22 of the conduit member E to admit lubricant under a thus predetermined minimum pressure to the discharge orifice F and into the lubricant receiving fitting N. A stud screw 25 extended through the wall of the clamping member C and into a slot 26 formed in the outer wall of the conduit member E serves to maintain proper registration between the clamping jaw D and the discharge orifice F of the nozzle. Under certain operating conditions as where high resistance to the discharge of lubricant into the bearing or other member with which the fitting N is associated is encountered the operator may turn back on the screw plunger 6 to relieve pressure within the chamber 19 and thus permit removal of the nozzle from the fitting head. Ordinarily the pressure within the chamber 9 will become dissipated to a degree sufficient to permit removal of the nozzle by relief through the fitting N and lubricant canals or crevices of the bearing or other lubricant receiving member.

In Fig. 3 another form of the nozzle is illustrated which is similar in many respects to the nozzle of Figs. 1, 2 and 4 and wherein like reference numerals have been employed to designate like parts. The principle difference in structure lies in the use of a lubricant resisting rubber annulus instead of a spring as the resilient means G for urging the conduit A forwardly within the clamping member G and in the disposition of a rawhide cup washer 27 upon the forward end wall of the flange 15 of the conduit A. A threaded bushing 28 serves to close the rearward end of the clamping member C.

In operation lubricant under pressure admitted to the chamber 19 subsequent to internal engagement of the nozzle with the head 21 of the fitting will effect an expansion of the chamber by movement of the conduit member C and the conduit A away from one another to clamp the nozzle upon the fitting head and subsequently to compress the rubber annulus comprising the resilient means G an amount sufficient to cause the valve plunger B to withdraw from the bore 22 of the conduit member E and admit lubricant under a predetermined minimum pressure to the discharge orifice F and to the fitting N.

It is to be understood that the embodiments of the invention herein set forth are presented for the purpose of illustration only, and various changes may be made without departing from the spirit of the invention and the scope of the appended claims.

I claim:

1. A lubricant discharge nozzle comprising a tubular member, a pair of aligned conduit members slidably disposed within said tubular member, said conduit members being formed to provide cooperating portions comprising a valve adapted to shut off communication between the conduit members when moved into engagement with one another, the outer end of one of said conducting members having a fitting engaging nozzle portion and the outer end of the other conduit member being fashioned for direct connection to a source of lubricant supply, resilient means urging the last named of said conduit members into engagement with the other, pressure operated means operable by pressure admitted through said resiliently urged conduit for urging the members apart from one another to open the said valve against the force of said resilient means, and a clamping jaw cooperating with said nozzle portion of said conduit member to clamp a lubricant receiving fitting therebetween when said conduit members are urged apart from one another.

2. A lubricant discharge nozzle comprising a tubular member, a pair of aligned conduit members slidably disposed within said tubular member, a clamping jaw formed on said tubular member adapted to cooperate with the adjacent of said conduit members to clamp a lubricant receiving fitting therebetween, said conduit members being formed to provide cooperating portions comprising a valve adapted to shut off communication between the conduit members when moved into engagement with one another, resilient means urging one of the conduit members into engagement with the other, said resiliently urged conduit member being adapted for direct connection with a source of lubricant supply, and pressure operated means operable by pressure admitted through said resiliently urged conduit for urging the members apart from one another to open the said valve, against the force of said resilient means, and for clamping said nozzle upon said lubricant receiving fitting.

3. A lubricant discharge nozzle comprising a tubular member having a clamping jaw associated therewith, a conduit member slidable in said tubular member and provided with a discharge orifice the walls of which provide a contact area to engage the head of a lubricant receiving fitting, said contact area being operatively aligned with said clamping jaw, a second conduit member slidably disposed in said tubular member and having one end extending exteriorly of said tubular member, a closure member carried by said second conduit member for engaging with and closing the adjacent mouth of said first named conduit member, yieldable means urging said second named conduit member toward said first named conduit member to operate said closure member and means for applying lubricant pressure between said conduit members to separate the members and to urge said first named conduit member toward said clamping jaw to clamp said nozzle upon said fitting.

4. In a lubricant discharge nozzle, a pair of aligned conduit members, one of said conduit members being formed for engagement with a lubricant receiving fitting, the other of said conduit members having a plunger adapted to enter and close the bore of the first named conduit member when the members are moved into engagement with one another, a compression spring for urging said second named conduit member into engagement with the first named conduit member and said conduit members being constructed and arranged to be responsive to lubricant pressure admitted to the nozzle through said second named conduit to urge the conduit members apart when said pressure exceeds an amount determinable by the force of said spring.

5. In a lubricant discharge nozzle, a pair of aligned conduit members, one of said conduit members being formed for engagement with a lubricant receiving fitting, the other of said conduit members having a plunger adapted to enter and close the bore of the other conduit member when the members are moved into engagement with one another, a compression spring for urging said second named conduit member into engagement with the first named conduit member, said conduit members being constructed and arranged to be responsive to lubricant pressure admitted to the nozzle through said second named conduit to urge the conduit members apart when said pressure exceeds an amount determinable by the force of said spring, said first named conduit member adapted to be brought into clamping engagement with said fitting prior to withdrawal of said plunger from said first named conduit.

6. A lubricant discharge nozzle comprising a conduit member adapted to engage with the head of a lubricant receiving fitting and to form a lubricant tight seal therewith, lubricant pressure operated means for clamping the said conduit member upon the head of a lubricant fitting, and a second conduit member in axial alignment with the first named conduit member and cooperable therewith to shut off the lubricant flow between the second conduit member and the first conduit member, said second conduit member being adapted for direct connection with a source of lubricant supply, yielding means operable to produce relative movement between the first and second conduit members toward one another thereby to shut off lubricant flow therebetween, said pressure operated means being operable to overpower the said yielding means subsequent to the clamping of the first conduit member upon said fitting head thereby to admit lubricant to the first said conduit.

CLARENCE H. BOCK.